United States Patent
Tremblay et al.

(10) Patent No.: US 7,048,842 B2
(45) Date of Patent: *May 23, 2006

(54) ELECTROLYSIS CELL FOR GENERATING CHLORINE DIOXIDE

(75) Inventors: Mario E. Tremblay, West Chester, OH (US); Craig M. Rasmussen, Loveland, OH (US); Dimitris I. Collias, Mason, OH (US); Michael D. Mitchell, Cincinnati, OH (US); Daniel F. Nesbitt, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 57 days.

This patent is subject to a terminal disclaimer.

(21) Appl. No.: 09/947,846

(22) Filed: Sep. 6, 2001

(65) Prior Publication Data

US 2003/0006144 A1  Jan. 9, 2003

Related U.S. Application Data

(60) Provisional application No. 60/300,211, filed on Jun. 22, 2001.

(51) Int. Cl.
   *C25B 1/30*    (2006.01)
   *C25D 17/00*   (2006.01)
(52) U.S. Cl. .................... 205/499; 205/556; 204/275.1
(58) Field of Classification Search ............... 205/556, 205/499; 204/275.1
   See application file for complete search history.

(56) References Cited

U.S. PATENT DOCUMENTS

| 2,163,793 A | 6/1939 | Logan |
| 3,616,355 A | 10/1971 | Themy |
| 4,048,047 A | 9/1977 | Beck et al. |
| 4,062,754 A | 12/1977 | Eibl |
| 4,100,052 A | 7/1978 | Stillman |
| 4,119,517 A | 10/1978 | Hengst |
| 4,328,084 A * | 5/1982 | Shindell |
| 4,761,208 A * | 8/1988 | Gram et al. |
| 4,917,782 A | 4/1990 | Davies |
| 5,294,307 A | 3/1994 | Jackson |
| 5,314,589 A | 5/1994 | Hawley |
| 5,316,740 A | 5/1994 | Baker et al. |
| 5,395,492 A | 3/1995 | Schoeberl |
| 5,439,576 A | 8/1995 | Schoeberl |
| 5,534,120 A | 7/1996 | Ando et al. |
| 5,753,098 A | 5/1998 | Bess, Jr. et al. |

(Continued)

FOREIGN PATENT DOCUMENTS

DE        3121337 A1    12/1982

(Continued)

OTHER PUBLICATIONS

Derwent Publication, XP-002205704, Nagy et al., no dates.

(Continued)

*Primary Examiner*—Arun S. Phasge
(74) *Attorney, Agent, or Firm*—Larry L. Huston; Leonard W. Lewis

(57) ABSTRACT

A method for making chlorine dioxide, by passing an aqueous feed solution comprising sodium chlorite into a non-membrane electrolysis cell comprising an anode and a cathode, adjacent to the anode, while flowing electrical current between the anode and the cathode to electrolyze the aqueous feed solution and convert the halogen dioxide salt to halogen dioxide. The anode is preferably a porous anode through which the aqueous feed solution passes to maximize the conversion of chlorite to chlorine dioxide.

22 Claims, 6 Drawing Sheets

U.S. PATENT DOCUMENTS

| | | | |
|---|---|---|---|
| 5,858,201 A * | 1/1999 | Otsuka et al. | 205/701 |
| 5,865,966 A | 2/1999 | Watanabe et al. | |
| 5,954,939 A | 9/1999 | Kanekuni et al. | |
| 6,203,688 B1 | 3/2001 | Lipsztajn et al. | |
| 6,306,281 B1 * | 10/2001 | Kelley | 205/556 |

FOREIGN PATENT DOCUMENTS

| | | |
|---|---|---|
| DE | 3341797 A1 | 5/1985 |
| DE | 3430631 A1 | 2/1986 |
| DE | 198 46 258 A1 | 4/2000 |
| DE | 100 17 407 A1 | 10/2001 |
| EP | 0 293 151 B1 | 11/1988 |
| EP | 0 353 367 B1 | 6/1993 |
| EP | 0 792 584 A1 | 9/1997 |
| WO | WO 91/09990 * | 7/1991 |
| WO | WO 91/09990 A1 | 7/1991 |
| WO | WO 97/40212 | 10/1997 |
| WO | WO 00/34184 A1 | 6/2000 |

OTHER PUBLICATIONS

Derwent Publication, XP-002205705, Pleshakov et al., no dates.

US 3,707,728, 12/1972, Stearns (withdrawn)

* cited by examiner

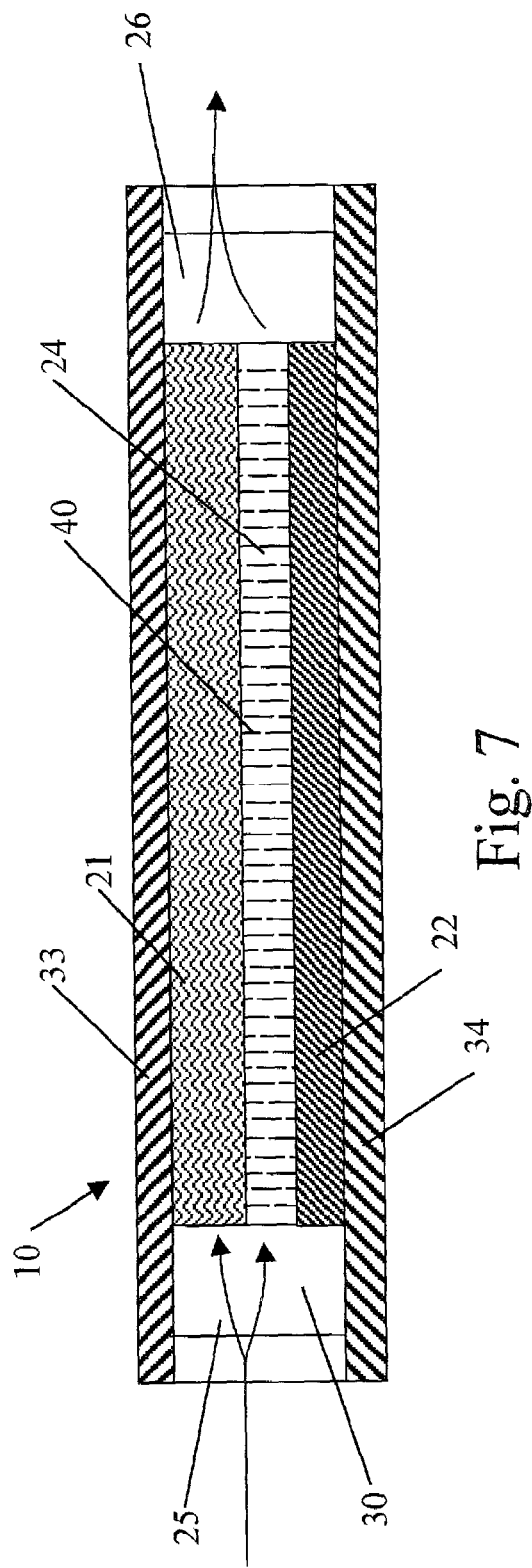
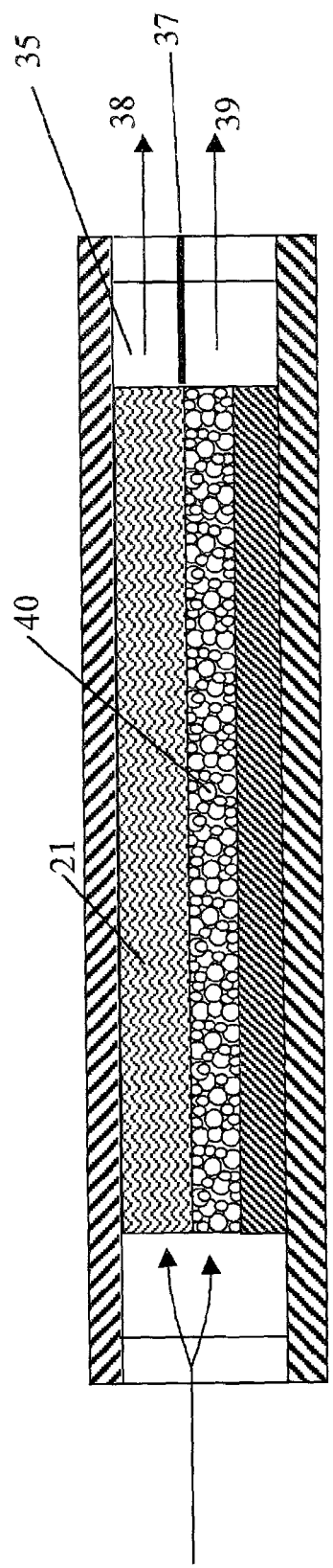
Fig. 7
Fig. 8

ELECTROLYSIS CELL FOR GENERATING CHLORINE DIOXIDE

CROSS REFERENCE TO RELATED APPLICATION

This application claims the benefit of U.S. Provisional Application No. 60/300,211, filed Jun. 22, 2001.

FIELD OF THE INVENTION

This invention relates to a method for generating halogen dioxide, preferably chlorine dioxide, from aqueous solutions containing a halogen dioxide salt, preferably chlorite salts.

BACKGROUND OF THE INVENTION

Chlorine dioxide, $ClO_2$, is one of the most effective bleaching agents for use in industrial and domestic process and services, and for commercial and consumer products. The strong oxidative potential of the molecule makes it ideal for a wide variety of uses that include disinfecting, sterilizing, and bleaching. Concentrations of chlorine dioxide in an aqueous solution as low as 1 part per million (ppm) or less, are known to kill a wide variety of microorganisms, including bacteria, viruses, molds, fungi, and spores. Higher concentrations of chlorine dioxide, up to several hundred ppms, provide even higher disinfection, bleaching and oxidation of numerous compounds for a variety of applications, including the paper and pulp industry, waste water treatment, industrial water treatment (e.g. cooling water), fruit-vegetable disinfection, oil industry treatment of sulfites, textile industry, and medical waste treatment.

Chlorine dioxide offers advantages over other commonly used bleaching materials, such as hypochlorite and chlorine. Chlorine dioxide can react with and break down phenolic compounds, and thereby removing phenolic-based tastes and odors from water. Chlorine dioxide is also used in treating drinking water and wastewater to eliminate cyanides, sulfides, aldehydes and mercaptans. The oxidation capacity of ClO2, in terms of available chlorine, is 2.5 times that of chlorine. Also, unlike chlorine/hypochlorite, the bactericidal efficiency of chlorine dioxide remains generally effective at pH levels of 6 to 10. Additionally, chlorine dioxide can inactivate C. parvum oocysts in water while chlorine/hypochlorite cannot. Hypochlorite and chlorine both react with the bleached target by inserting the chlorine molecule into the structure of the target. Though this mode of reaction can be effective, it can result in the formation of one or more chlorinated products, or by-products, which can be undesirable both from a economic sense (to eliminate hydrocarbons from the reaction media) and a safety and environmental standpoint. In addition, the step of bleaching by hypochlorite and chlorine results in the destruction of the bleach species itself, such that subsequent bleaching requires a fresh supply of the chlorine bleach. Another disadvantage is that certain microorganisms that are intended to be killed by these two commonly-used bleach materials can develop a resistance over time, specifically at lower concentrations of the chlorine or hypochlorite.

Chloride dioxide is generally used in an aqueous solution at levels up to about 35%. It is a troublesome material to transport and handle at high aqueous concentrations, due to its low stability and high corrosivity. This has required end users to generate chlorine dioxide on demand, usually employing a precursor such as sodium chlorite ($NaClO_2$) or sodium chlorate ($NaClO_3$).

A typical process for generating chlorine dioxide from sodium chlorate salt is the acid-catalyzed reaction:

Sodium chlorite is easier to convert to chlorine dioxide. A typical process for generating chlorine dioxide from sodium chlorite salt is the acid-catalyzed reaction:

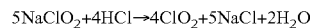

Further details on the acid-catalyzed reactions of chlorites and chlorates to produce chlorine dioxide can be found in "Chlorine Dioxide Generation Chemistry" (A. R. Pitochelli, Rio Linda Chemical Company), Third International Symposium: Chlorine Dioxide Drinking Water, Process Water and Wastewater Issues, Sep. 14, 15, 1995, La Meridian Hotel, New Orleans, La., incorporated herein by reference.

A common method of making chlorine dioxide uses a multi-chamber electrolysis cell that converts the chlorite salt into chlorine dioxide. This method uses separately an anode compartment and a cathode compartment that are separated by an ion permeable membrane. The separate compartments operate with significantly different reactants, and contain solutions with different pH values. One example of a multi-compartment electrolysis cell is disclosed in U.S. Pat. No. 4,456,510, issued to Murakami et al. on Jun. 26, 1984, which teaches a process for forming chlorine dioxide by electrolyzing a solution of sodium chlorite in an electrolysis cell that contains an anode compartment and a cathode compartment separated by a diaphragm, preferably a cation exchange membrane. Another example of a two-chamber electrolysis cell is disclosed in U.S. Pat. No. 5,158,658, issued to Cawlfield, et al. on Oct. 27, 1992 which describes a continuous electrochemical process and an electrolytic cell having an anode chamber having a porous flow-through anode, a cathode chamber, and a membrane there between.

While separate-compartment, membrane-containing electrolysis cells have been used to make chlorine dioxide on a commercial scale, they have not been completely satisfactory. Even though they may have convenience advantages over the conventional acid catalysis production of chlorine dioxide, the electrochemical approach has proven to be more expensive to produce large volumes of chlorine dioxide. The electrolysis cells in commercial use, and disclosed in the prior art that utilize ion permeable membranes or diaphragms, require that the anolyte solution be substantially free of divalent cations, such as magnesium and calcium, to avoid the formation of precipitated calcium or magnesium salts that would quickly block and cover the membrane, and significantly reduce or stop the electrolysis reaction.

Consequently, there remains a need for a simple, safe method and apparatus for manufacturing chlorine dioxide to meet a wide variety of commercial and domestic uses, under a wide variety of situations. The present invention describes a method and an apparatus for making chlorine dioxide inexpensively, easily and effectively.

SUMMARY OF THE INVENTION

The present invention relates to a method for making halogen dioxide from an aqueous solution comprising a halogen dioxide salt, using a non-membrane electrolysis cell. A non-membrane electrolysis cell is an electrolysis cell that comprises an anode electrode and a cathode electrode, and having a cell chamber, and which does not have an ion permeable membrane that divides the cell passage into two (or more) distinct anode and cathode chambers. The halogen dioxide salt is converted to the halogen dioxide as electricity passes through the aqueous feed solution in a passage that forms a portion of the cell chamber adjacent to the surface of the anode.

The present invention provides a method for making halogen dioxide, comprising the steps of: (1) providing an aqueous feed solution comprising a halogen dioxide salt; (2) passing the aqueous feed solution into a cell chamber of a non-membrane electrolysis cell comprising an anode and a cathode, and along a passage adjacent to the anode; (3) flowing an electrical current between the anode and the cathode, thereby electrolyzing the aqueous feed solution in the passage, whereby a portion of the halogen dioxide salt in the passage is converted to halogen dioxide; and (4) passing the electrolyzed aqueous solution out of the electrolysis cell, thereby forming an aqueous effluent comprising halogen dioxide.

BRIEF DESCRIPTION OF THE DRAWINGS

The various advantages of the present invention will become apparent to skilled artisans after studying the following specification and by reference to the drawings in which:

FIG. 7 is a sectional view of yet another electrolysis cell having a porous anode and a porous flow barrier.

FIG. 8 is a sectional view of still another electrolysis cell having a porous anode and a porous flow barrier.

DETAILED DESCRIPTION OF THE INVENTION

Figure 1:
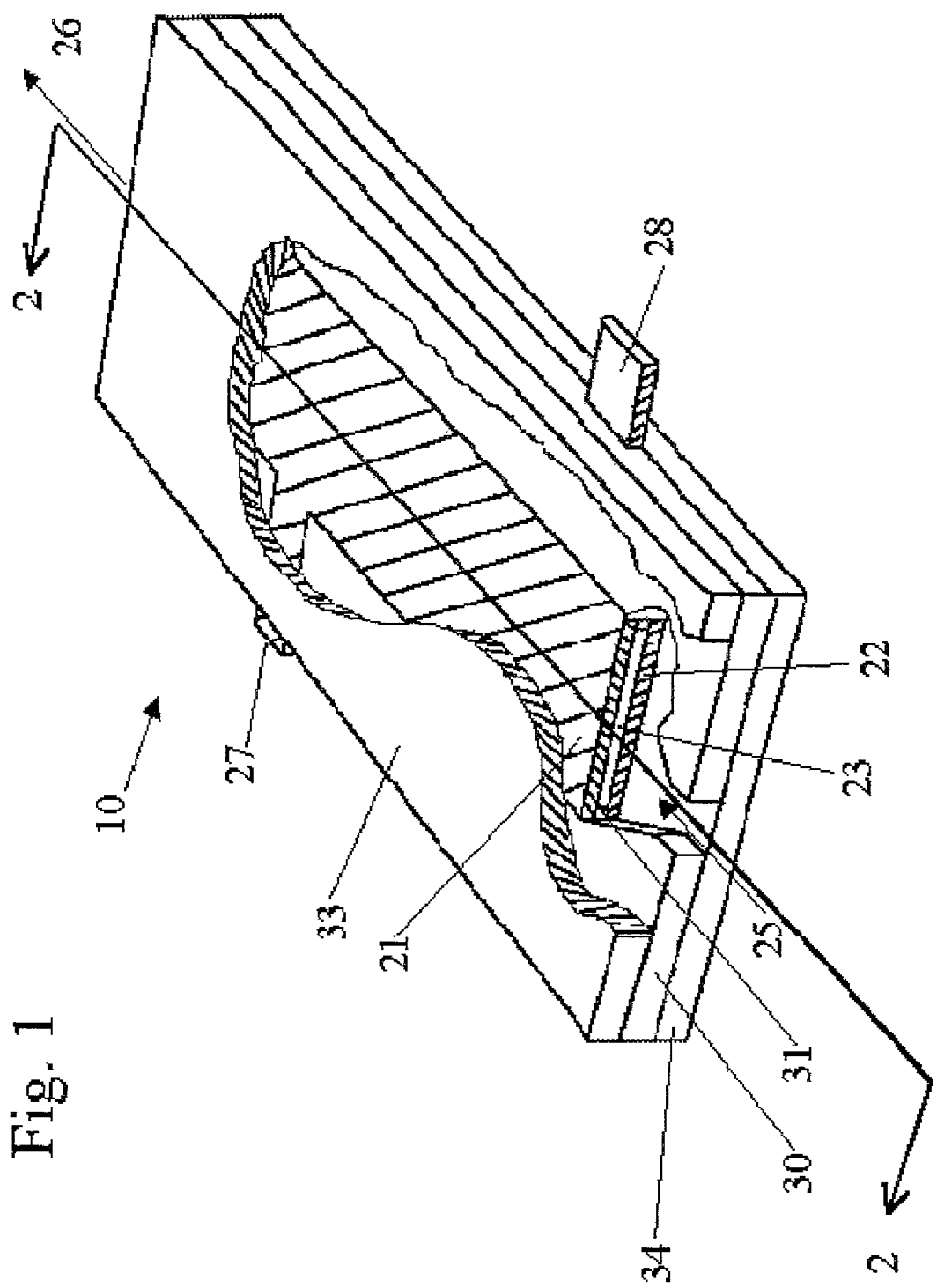
FIG. 1 shows an electrolysis cell used in the practice of the present invention.

The present invention employs an electrical current passing through an aqueous feed solution between an anode and a cathode to convert the halogen dioxide salt precursor dissolved within the solution into a halogen dioxide. When an aqueous solution flows through the chamber of the electrolysis cell, and electrical current is passed between the anode and the cathode, several chemical reactions occur that involve the water, as well as one or more of the other salts or ions contained in the aqueous solution.

At the anode, within a narrow layer of the aqueous solution in the passage adjacent to the anode surface, the following reaction occurs:

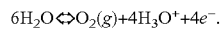

Without being bound by any particular theory, it is believed that the anode electrode withdraws electrons from the water adjacent to the anode, which results in the formation of $H_3O^+$ species in the narrow surface layer of aqueous feed solution. The $H_3O^+$ species react with the chlorine dioxide salt, for example, sodium chlorite, to generate chlorine dioxide in the aqueous solution within the passage at the anode surface region. This surface layer is believed to be about 100 nanometers in thickness. Flow dynamics, which include the movement of molecules in a flowing solution by turbulence, predict that the conversion of chlorite salts to chlorine dioxide will increase as the solution flow path nears the anode surface layer. Consequently, electrolysis cells and electrolysis systems of the present invention preferably maximize the flow of the aqueous feed solution through this surface layer adjacent the anode, in order to maximize the conversion of chlorite to chlorine dioxide.

Although the present invention relates to halogen dioxide product and can include iodine dioxide, bromine dioxide and fluorine dioxide, the more common and most preferred product is chlorine dioxide.

The precursor material from which the halogen dioxide is formed is referred to as a halogen dioxide salt. The more common and most preferred halogen dioxide salt is the corresponding halite salt of the general formula $MXO_2$, wherein M is selected from alkali and alkali-metal earth metal, and is more commonly selected from sodium, potassium, magnesium and calcium, and is most preferably sodium; and wherein X is halogen and is selected from Cl, Br, I and F, and is preferably Cl. The halogen dioxide salt can comprise two or more salts in various mixtures.

The aqueous feed solution comprises the halogen dioxide salt, which for simplicity will be exemplified herein after by the most preferred halite salt, sodium chlorite. Sodium chlorite is not a salt ordinarily found in tap water, well water, and other water sources. Consequently, an amount of the sodium chlorite salt is added into the aqueous feed solution at a desired concentration generally of at least 0.1 ppm.

The level of chlorite salt comprised in the aqueous feed solution can be selected based on the required bleaching or disinfection required by the chlorine dioxide, in addition to the conversion efficiency of the electrolysis cell to convert the sodium chlorite to the product chloride dioxide. The level of sodium chlorite is generally from about 1 ppm to about 10,000 ppm. For disinfection of a water source, a sodium chlorite level is preferably from about 1 ppm to about 5000 ppm, and more preferably about 10 ppm to about 1000 ppm. The resulting halogen dioxide product level is from about 0.1 ppm to about 10,000 ppm, preferably from about 1 ppm to about 200 ppm. For bleaching purposes, a sodium chlorite level of from about 100 ppm to about 10,000 ppm is preferred.

The range of chlorine dioxide conversion that is achievable in the electrolysis cells of the present invention generally ranges from less than about 1% to about 99%. The level of conversion is dependent most significantly on the design of the electrolysis cell, herein after described, as well as on the electrical current properties used in the electrolysis cell.

The aqueous feed solution can comprise de-ionized water, and substantially no chloride ($Cl^-$) or other halide ions, which upon electrolysis can form chlorine or a mixed oxidant, including hypochlorite. Preferably, aqueous effluent comprises less than about 1.0 ppm, and more preferably less than 0.1 ppm, of chlorine.

The aqueous feed solution can optionally comprise one or more other salts in addition to the sodium chlorite. These optional salts can be used to enhance the disinfection and bleaching performance of the effluent that is discharged from the electrolysis cell, or to provide other mixed oxidants in response to the passing of electrical current through the electrolysis cell. A preferred other salt is an alkali halide, that is most preferably a sodium chloride. A preferred apparatus and method for electrolyzing aqueous solutions comprising alkali halides is disclosed in co-pending, commonly-assigned U.S. provisional patent application 60/280,913, filed on Apr. 2, 2001.

The aqueous feed solution comprising the sodium chlorite can be provided in a variety of ways. A solid, preferably powdered, form of the sodium chlorite can be mixed into an aqueous solution to form a dissolved solution, which can be used as-is as the aqueous feed solution or, if in a concentrated solution can be subsequently diluted with water. Preferably, a concentrated solution of about 2% to about 35% sodium chlorite can be used.

The present invention can optionally use a local source of halogen dioxide salt, and a means for delivering the halogen dioxide salt to the aqueous feed solution. This embodiment is advantageously used in those situations when the target water to be treated with the electrolysis cell does not contain a sufficient amount, or any, of the halogen dioxide salt. The local source of halogen dioxide salt can be released into a stream of the aqueous solution, which then passes through the electrolysis cell. The local source of halogen dioxide salt can also be released into a portion of a reservoir of aqueous solution, which portion is then drawn into the electrolysis cell. Preferably, all the local source of halogen dioxide salt passes through the electrolysis cell, to maximize the conversion to halogen dioxide, and to limit the addition of salts to the reservoir generally. The local source of halogen dioxide salt can also supplement any residual levels of halogen dioxide salt already contained in the aqueous solution.

The local source of halogen dioxide salt can be a concentrated brine solution, a salt tablet in fluid contact with the reservoir of electrolytic solution, or both. A preferred local source of halogen dioxide salt is a solid or powdered material. The means for delivering the local source of halogen dioxide salt can comprise a salt chamber comprising the halogen dioxide salt, preferably a pill or tablet, through which a portion of the aqueous solution passes, thereby dissolving a portion of the halogen dioxide salt to form the aqueous feed solution. The salt chamber can comprise a salt void formed in the body of the device that holds the electrolysis cell, which is positioned in fluid communication with the portion of aqueous solution that will pass through the electrolysis cell.

In certain circumstances, a preferred halogen dioxide salt has a reduced solubility in water, compared to sodium chlorite, to control the rate of dissolution of the halogen dioxide salt. Examples of preferred halogen dioxide salts are the less soluble calcium chlorite and magnesium chlorite salts. A pill or tablet can also be formulated with other organic and inorganic materials to control the rate of dissolution of the halogen dioxide salt. Preferred is a slow dissolving salt tablet, to release sufficient halogen dioxide salt to form an effective amount of halogen dioxide product. The release amount of the halogen dioxide salt is typically, between 1 milligram to 10 grams halogen dioxide salt, for each liter of solution passed through the electrolysis cell. The halide pill can be a simple admixture of the halogen dioxide salt with the dissolution control materials, which can be selected from various well-known encapsulating materials, including but not limited to fatty alcohol, fatty acids, and waxes.

Any water source can be used to form the aqueous feed solution, including well water, tap water, softened water, and industrial process water, and waste waters. However, for many applications of the invention, distilled or de-ionized water is most preferred to form an effluent solution with essentially only chlorine dioxide active. Since distilled and de-ionized water do not contain any of a variety of other salts, including sodium chloride, appreciable amounts of other mixed oxidants will not be formed. Even in those situations where one prefers to include other salts, including sodium chloride, in solution with the sodium chlorite, de-ionized water is more preferred, as it allows for better control of the types and amounts of the salts being passed through the electrolysis cell.

The addition of other salts or electrolytes into the selected water source will increase the conductivity of the water, which will increase the amount of chlorine dioxide, and any mixed oxidants, produced. However, the increase in conductivity may not result in a higher productivity efficiency, since the increase in conductivity will increase the current draw. Therefore, while more chlorine dioxide will be produced, more power will be drawn. A suitable chlorine dioxide productivity equation is expressed by equation I, $$\eta = (CClO_2 * Q)/(I * V) \qquad (I)$$

wherein:

$\eta$ units are micrograms of chlorine dioxide per minute, per watt of power used;

$CClO_2$ is the concentration of the generated chlorine dioxide in milligrams per liter (mg/l);

I is the electric current in amps;

Q is the volumetric flow rate in milliliters per minute (ml/m); and

V is electric potential across the cell in volts.

The pH of the aqueous feed solution containing the halogen dioxide salt is preferably above about 3, and more preferably above about 5. If the pH of the aqueous feed solution is too low, the sodium chlorite, for example, can begin to react with the hydronium ions in the feed solution and convert to chlorine dioxide, even before entering the electrolysis cell. The aqueous feed solution is preferably maintained at a pH of less than 10, and more preferably at a pH of less than 8. Most preferably, the pH of the feed solution is between about 6 and 8.

The present invention is particularly well suited for the preparation of aqueous effluents containing chlorine dioxide when the aqueous feed solution is a water source that contains calcium and other divalent salts that can precipitate salts as a by-product of the water electrolysis. Because the present electrolysis cell does not have an ion permeable membrane separating the cell into separate anode and cathode chambers, there is reduced risk that the precipitation of calcium or other divalent salt will inhibit or stop the electrical current flow and the conversion of halite to halogen dioxide.

The aqueous feed solution containing the sodium chlorite can be fed to the electrolysis cell from a batch storage container. Alternatively, the feed solution can be prepared continuously by admixing a concentrated aqueous solution of sodium chlorite with a second water source, and passing continuously the admixture to the electrolysis cell. Optionally, a portion of the aqueous feed solution can comprise a recycled portion of the effluent from the electrolysis cell. And, the aqueous feed solution can comprise a combination of any of the forgoing sources. The aqueous feed solution can flow continuously or periodically through the electrolysis cell.

Electrolysis Cell

The electrolysis cell generates chlorine dioxide from the sodium chlorite by flowing electrical current through the aqueous feed solution that passes through the cell chamber. The electrolysis cell comprises at least a pair of electrodes, an anode and a cathode. The cell also comprises a cell chamber through which the aqueous feed solution passes, and includes a passage that is adjacent to the anode. The passage includes the narrow surface layer adjacent to the anode surface where the conversion reaction occurs. It is preferred to pass as much of the mass of the aqueous effluent solution through the passage and its narrow anode surface region as possible.

In one embodiment of the present invention, the cell comprises an anode and a confronting (and preferably, co-extensive) cathode that are separated by a cell chamber that has a shape defined by the confronting surfaces of the pair of electrodes. The cell chamber has a cell gap, which is the perpendicular distance between the two confronting electrodes. Typically, the cell gap will be substantially constant across the confronting surfaces of the electrodes. The cell gap is preferably 0.5 mm or less, more preferably 0.2 mm or less.

The electrolysis cell can also comprise two or more anodes, or two or more cathodes. The anode and cathode plates are alternated so that an anode is confronted by a cathode on each face, with a cell chamber there between. Examples of electrolysis cells that can comprise a plurality of anodes and cathodes are disclosed in U.S. Pat. No. 5,534,120, issued to Ando et al. on Jul. 9, 1996, and U.S. Pat. No. 4,062,754, issued to Eibl on Dec. 13, 1977, which are incorporated herein by reference.

Generally, the electrolysis cell will have one or more inlet openings in fluid communication with each cell chamber, and one or more outlet openings in fluid communication with the chambers. The inlet opening is also in fluid communication with the source of aqueous feed solution, such that the aqueous feed solution can flow into the inlet, through the chamber, and from the outlet of the electrolysis cell. The effluent solution (the electrolyzed aqueous feed solution that exits from the electrolysis cell) comprises an amount of chlorine dioxide that was converted within the cell passage in response to the flow of electrical current through the solution. The effluent solution can be used as a source of chlorine dioxide, for example, for disinfecting or bleaching articles, or for treating other volumes of water or aqueous solutions. The effluent can itself be a treated solution, where the feed solution contains microorganisms or some other oxidizable source material that can be oxidized in situ by the chlorine dioxide that is formed.

The present invention also provides a halogen dioxide generating system, comprising:

a) a source of an aqueous feed solution comprising a halogen dioxide salt;
b) a non-membrane electrolysis cell having a cell chamber, and comprising an anode and a cathode, the cell chamber having a passage adjacent to the anode, and an inlet and an outlet in fluid communication with the cell chamber;
c) a means for passing the aqueous feed solution into the cell chamber, along the passage, and out of the outlet; and
d) an electric current supply to flow a current through the aqueous solution in the chamber, to convert a portion of the halogen dioxide salt in the passage to halogen dioxide, and thereby form an aqueous effluent comprising halogen dioxide.

Figure 2:
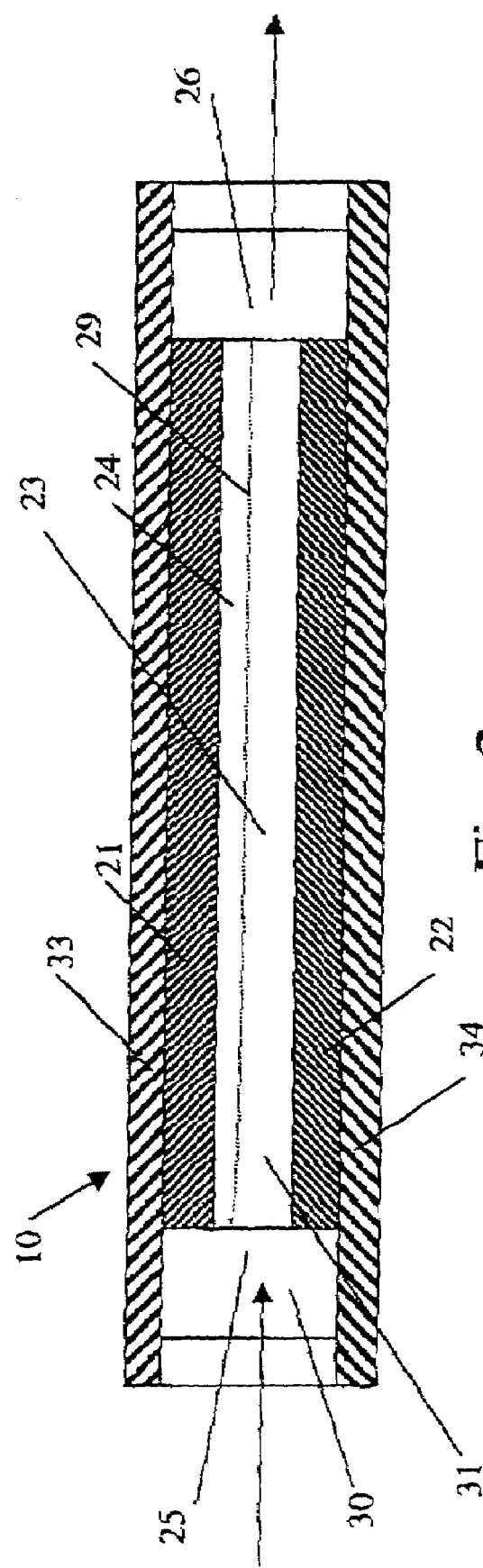
FIG. 2 shows a sectional view of the electrolysis cell of FIG. 1 though line 2—2.

FIG. 1 and FIG. 2 show an embodiment of an electrolysis cell 10 of the present invention. The cell comprises an anode 21 electrode, and a cathode 22 electrode. The electrodes are held a fixed distance away from one another by a pair of opposed non-conductive electrode holders 30 having electrode spacers 31 that space apart the confronting longitudinal edges of the anode and cathode to form a cell chamber 23 having a chamber gap. The chamber 23 has a cell inlet 25 through which the aqueous feed solution can pass into of the cell, and an opposed cell outlet 26 from which the effluent can pass out of the electrolysis cell. The assembly of the anode and cathode, and the opposed plate holders are held tightly together between a non-conductive anode cover 33 (shown partially cut away) and cathode cover 34, by a retaining means (not shown) that can comprise non-conductive, water-proof adhesive, bolts, or other means, thereby restricting exposure of the two electrodes only to the electrolysis solution that flows through the chamber 23. Anode lead 27 and cathode lead 28 extend laterally and sealably through channels made in the electrode holders 30.

FIG. 2 shows cell chamber 23 and the passage 24 along the anode 21 surface. The passage 24 is a portion of the cell chamber 23, though it is shown with a boundary 29 only to illustrate its adjacent to the anode 21, and not to show the relative proportion or scale relative to the cell chamber.

Figure 3:
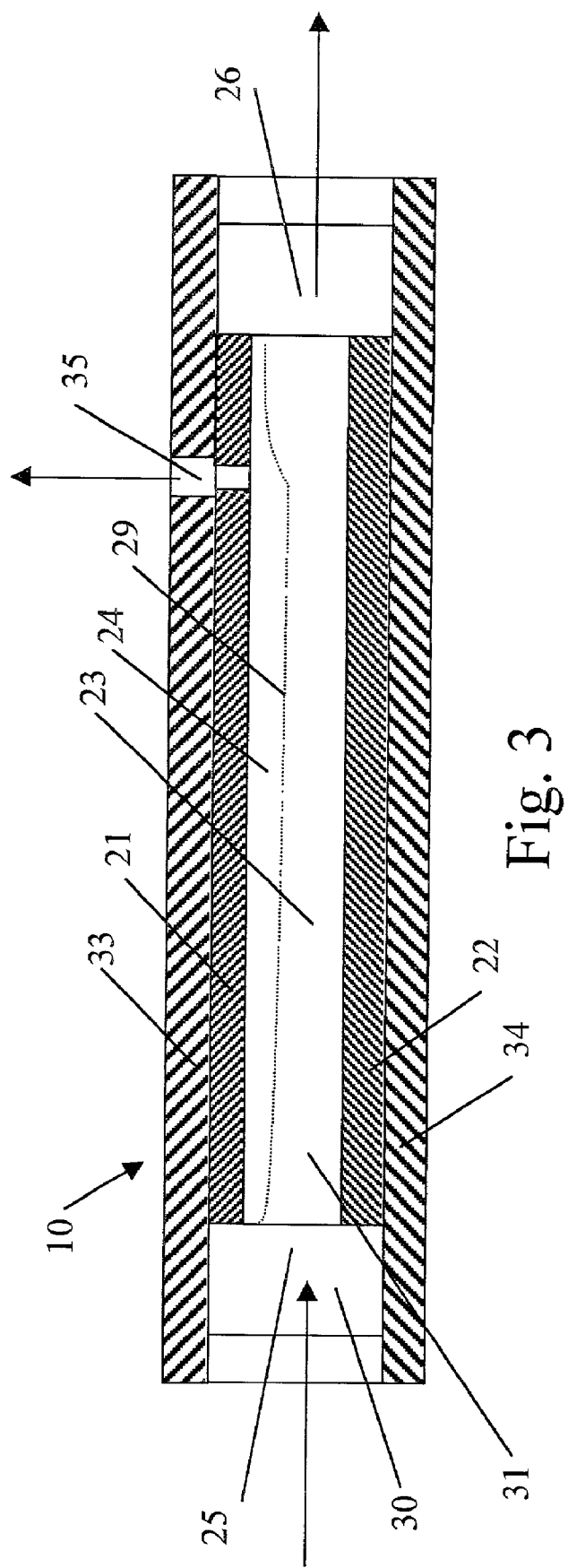
FIG. 3 shows a sectional view of an alternative electrolysis cell used in the practice of the present invention.

Another embodiment of the electrolysis cell of the present invention is shown in FIG. 3. This electrolysis cell has an anode outlet 35. The anode outlet removes a portion of the electrolyzed feed solution flowing in the passage 24 adjacent the anode 21 as an anode effluent. The remainder of the cell effluent exits from the cell outlet 26, which hereafter will also be referred to as the cathode effluent and the cathode outlet, respectively. Similar electrolysis cells that remove a portion of the electrolyzed solution flowing adjacent the anode through an anode outlet are described in U.S. Pat. No. 5,316,740, issued to Baker et al. on May 31, 1994, U.S. Pat. No. 5,534,120 issued to Ando et al. on Jul. 9, 1996, and U.S. Pat. No. 5,858,201, issued to Otsuka et al. on Jan. 12, 1999. Particularly preferred is an electrolysis cell as shown in FIG. 3 of U.S. Pat. No. 4,761,208 that uses a physical barrier (element 16) positioned between the anode and the cathode adjacent the outlet, whereby mixing of the solution adjacent the anode with the solution adjacent the cathode can be minimized or eliminated prior to removal through the anode outlet. Preferably, the cathode effluent, which will comprise a low level or no chlorine dioxide product, is passed back to and mixed into the aqueous feed solution.

An electrode can generally have any shape that can effectively conduct electricity through the aqueous feed solution between itself and another electrode, and can include, but is not limited to, a planar electrode, an annular electrode, a spring-type electrode, and a porous electrode. The anode and cathode electrodes can be shaped and positioned to provide a substantially uniform gap between a cathode and an anode electrode pair, as shown in FIG. 2. On the other hand, the anode and the cathode can have different shapes, different dimensions, and can be positioned apart from one another non-uniformly. The important relationship between the anode and the cathode is for a sufficient flow of current through the anode at an appropriate voltage to promote the conversion of the halite salt to halogen dioxide within the cell passage adjacent the anode.

Planar electrodes, such as shown in FIG. 2, have a length along the flow path of the solution, and a width oriented transverse to the flow path. The aspect ratio of planar electrodes, defined by the ratio of the length to the width, is generally between 0.2 and 10, more preferably between 0.1 and 6, and most preferably between 2 and 4.

The electrodes, both the anode and the cathode, are commonly metallic, conductive materials, though non-metallic conducting materials, such as carbon, can also be used. The materials of the anode and the cathode can be the same, but can advantageously be different. To minimize corrosion, chemical resistant metals are preferably used. Examples of suitable electrodes are disclosed in U.S. Pat. Nos. 3,632,498 and 3,771,385. Preferred anode metals are stainless steel, platinum, palladium, iridium, ruthenium, as well as iron, nickel and chromium, and alloys and metal oxides thereof More preferred are electrodes made of a valve metal such as titanium, tantalum, aluminum, zirconium, tungsten or alloys thereof, which are coated or layered with a Group VIII metal that is preferably selected from platinum, iridium, and ruthenium, and oxides and alloys thereof One preferred anode is made of titanium core and coated with, or layered with, ruthenium, ruthenium oxide, iridium, iridium oxide, and mixtures thereof, having a thickness of at least 0.1 micron, preferably at least 0.3 micron.

For many applications, a metal foil having a thickness of about 0.03 mm to about 0.3 mm can be used. Foil electrodes should be made stable in the cell so that they do not warp or flex in response to the flow of liquids through the passage that can interfere with proper electrolysis operation. The use of foil electrodes is particularly advantageous when the cost of the device must be minimized, or when the lifespan of the electrolysis device is expected or intended to be short, generally about one year or less. Foil electrodes can be made of any of the metals described above, and are preferably attached as a laminate to a less expensive electrically-conductive base metal, such as tantalum, stainless steel, and others.

A particularly preferred anode electrode of the present inventions is a porous, or flow-through anode. The porous anode has a large surface area and large pore volume sufficient to pass there through a large volume of aqueous feed solution. The plurality of pores and flow channels in the porous anode provide a greatly increased surface area providing a plurality of passages, through which the aqueous feed solution can pass. Porous media useful in the present invention are commercially available from Astro Met Inc. in Cincinnati, Ohio, Porvair Inc. in Henderson, N.C., or Mott Metallurgical in Farmington, Conn. Alternately U.S. Pat. Nos. 5,447,774 and 5,937,641 give suitable examples of porous media processing. Preferably, the porous anode has a ratio of surface area (in square centimeters) to total volume (in cubic centimeters) of more than about 5 $cm^{-1}$, more preferably of more than about 10 $cm^{-1}$, even more preferably more than about 50 $cm^{-1}$, and most preferably of more than about 200 $cm^{-1}$. Preferably the porous anode has a porosity of at least about 10%, more preferably of about 30% to about 98%, and most preferably of about 40% to about 70%. Preferably, the porous anode has a combination of high surface area and electrical conductivity across the entire volume of the anode, to optimize the solution flow rate through the anode, and the conversion of chlorite salt contained in the solution to the chlorine dioxide product.

The flow path of the aqueous feed solution through the porous anode should be sufficient, in terms of the exposure time of the solution to the surface of the anode, to convert the chlorite salt to the chlorine dioxide. The flow path can be selected to pass the feed solution in parallel with the flow of electricity through the anode (in either the same direction or in the opposite direction to the flow of electricity), or in a cross direction with the flow of electricity. The porous anode permits a larger portion of the aqueous feed solution to pass through the passages adjacent to the anode surface, thereby increasing the proportion of the halogen dioxide salt that can be converted to the halogen dioxide product.

Figure 4:
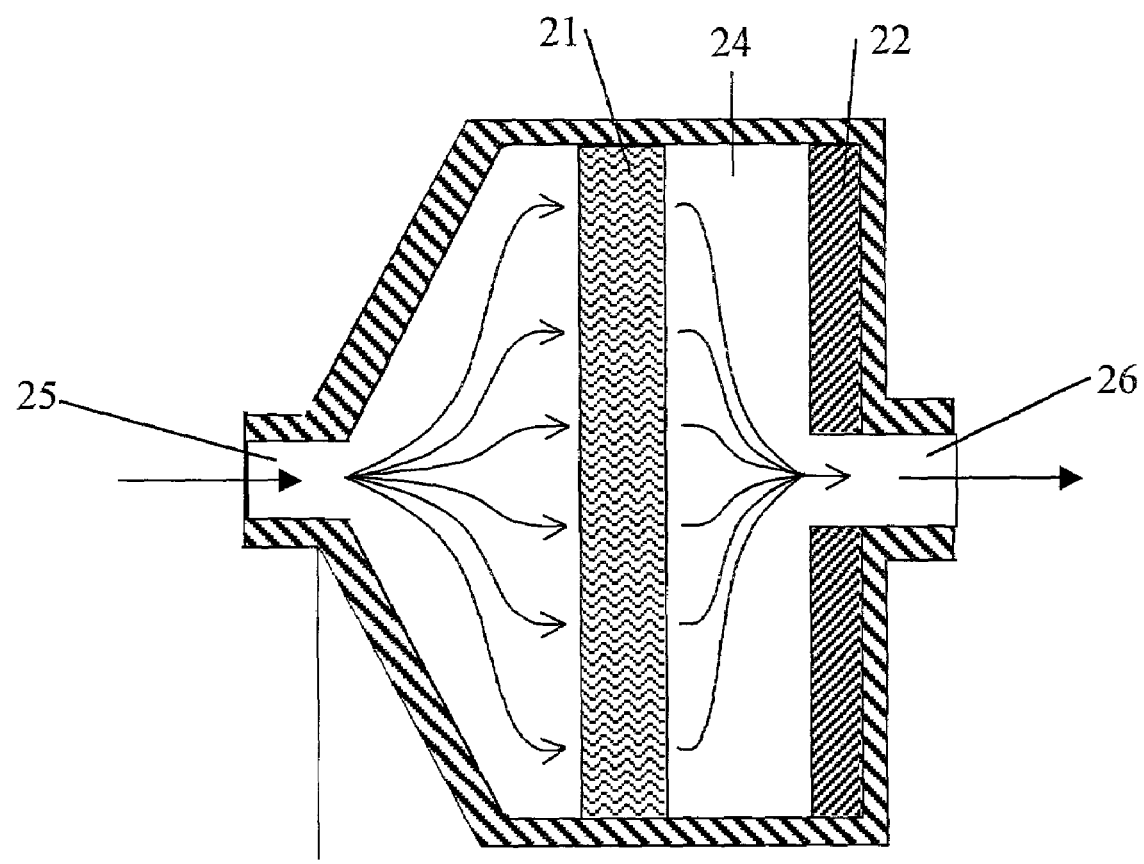
FIG. 4 is a sectional view of another electrolysis cell having a porous anode.

FIG. 4 shows an electrolysis cell comprising a porous anode 21. The porous anode has a multiplicity of capillary-like flow passages 24 through which the aqueous feed solution can pass adjacent to the anode surfaces within the porous electrode. In the electrolysis cell of FIG. 4, the aqueous feed solution flows in a parallel direction to the flow of electricity between the anode and the cathode.

Figure 5:
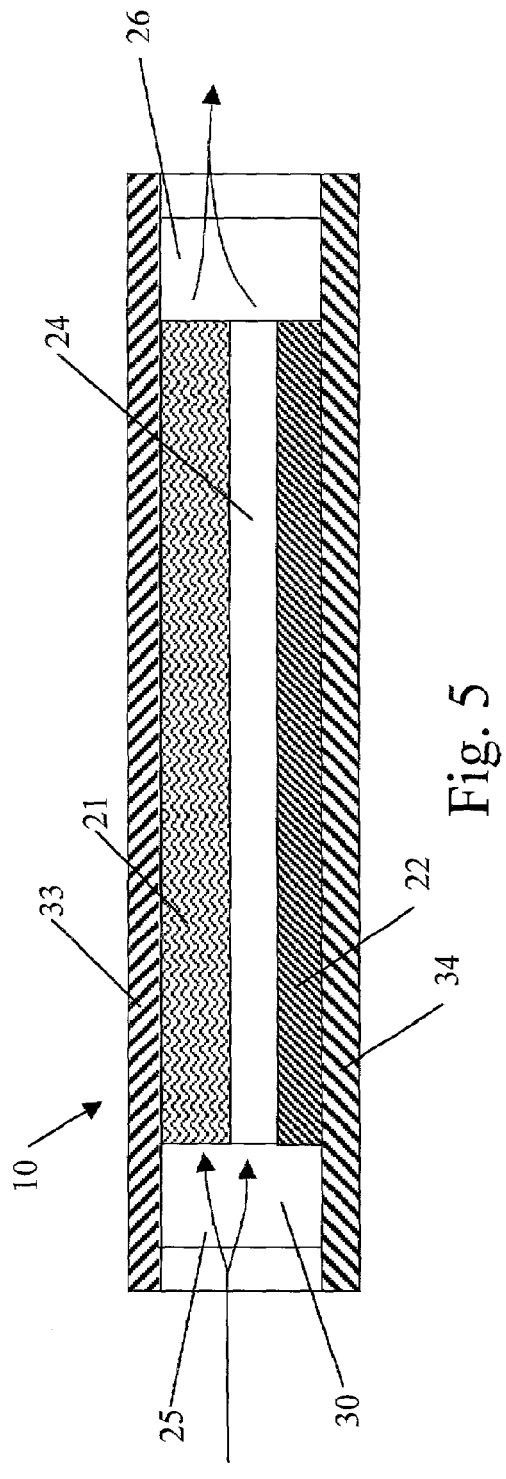
FIG. 5 is a sectional view of yet another electrolysis cell having a porous anode.

Another embodiment of an electrolysis cell having a porous anode is shown in FIG. 5. In this embodiment, the flow of aqueous feed solution is in a cross direction to the flow of electricity between the anode and the cathode. Because the flow passages through the porous anode are generally small (less than 0.2 mm), the flow of a unit of solution through a porous anode will require substantially more pressure that the same quantity flowing through an open cell chamber. Consequently, if aqueous feed solution is introduced into an electrolysis cell having a porous anode and an open chamber, generally the amount of solution flowing through the porous anode and across its surfaces will be significantly diminished, since the solution will flow preferentially through the open cell chamber.

Figure 6:
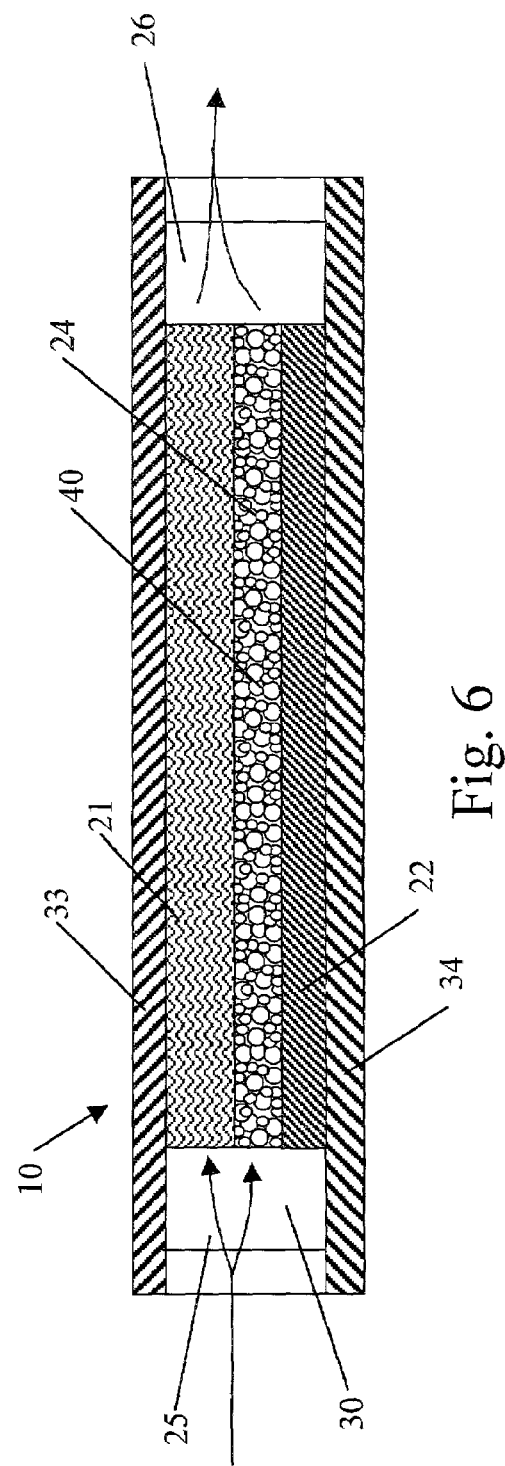
FIG. 6 is a sectional view of another electrolysis cell having a porous anode and a porous flow barrier.

To address the above problem where the aqueous feed solution can by-pass the porous anode, the cell chamber is preferably provided, as shown in FIG. 6, with a non-conducting, porous flow barrier 40, within the volume of the cell chamber 24 between the cathode 22 and the porous anode 21. The porous barrier 40 is non-conducting, to prevent electricity from short-circuiting between the anode and the cathode via the chamber material. The porous barrier exerts a solution pressure drop as the aqueous feed solution flows through the cell chamber. The porous barrier should not absorb or retain water, and should not react with the aqueous solution and chemical ingredients therein, including the halogen dioxide products. The porous barrier 40 can be made of a non-conducting material selected from, but not limited to, plastics such as polyethylene, polypropylene, and polyolefin, glass or other siliceous material, and silicon. The porous barrier can comprise a plurality of spheres, ovals, and other shaped objects of the same size or of different sizes, that can be packed loosely, or as a unified matrix of articles, into the chamber. FIG. 6 shows the porous barrier 40 as a matrix of spherical objects of varying diameters. The porous barrier 40 can also be a one or more baffles, which substantially restrict the flow of the solution through the cell chamber 24. As shown in FIG. 7, such baffles can comprise a series of vertical barriers having apertures therein for restricting the flow of solution. The restricted flow of aqueous feed solution through the non-conducting, porous barrier significantly reduces the proportion of aqueous feed solution that can pass through cell chamber, thereby increasing the proportion of halogen dioxide salt that is converted in the passages 23 within the porous anode 21.

While the solution flowing through the porous anode and the cell chamber 24 containing the porous barrier 40 can mix and flow back and forth somewhat between each other, the effluents exiting from the different areas of the outlet end 26 of the cell have substantially different solution compositions. The effluent 38 exiting the porous anode will have a significantly lower pH and higher conversion of halogen dioxide product than the effluent 39 exiting the cell chamber adjacent to the cathode. The effluent 38 exiting the porous anode can be separated from the effluent 39 and removed from the cell by placing a barrier 37 as shown in FIG. 8.

Another embodiment of the present invention uses an electrolysis cell that has an open chamber. The open-chamber electrolysis cell is particularly useful in the practice of the invention in reservoirs of aqueous feed solution, including pools, bath tubs, spas, tanks, and other open bodies of water. The aqueous feed solution can flow into the cell and to the anode from various directions. The halogen dioxide salt in the aqueous feed solution can be contained in the reservoir solution, or can be delivered into the reservoir solution locally as a local source of halogen dioxide salt, as herein before described. Examples of open-chamber electrolysis cells include those described in U.S. Pat. No. 4,337,136 (Dahlgren), U.S. Pat. No. 5,013,417 (Judd), U.S. Pat. No. 5,059,296 (Sherman), and U.S. Pat. No. 5,085,753 (Sherman).

An alternative system for generating halogen dioxide comprises a batch container containing the aqueous feed solution. A re-circulating pump circulates the feed solution from the container through an electrolysis cell, and discharges the effluent back to the batch container. In time, the concentration of the un-reacted chlorite salt in the solution will be reduced to essentially zero, whereby the charged amount of sodium chlorite in the aqueous feed solution will have been nearly completely converted to chlorine dioxide product. In a slightly different system, the electrolysis cell can be positioned within the batch container, submerged within the aqueous solution comprising the sodium chlorite. A pump or mixer within the container forces the solution through the electrolysis cell, and re-circulates the solution until the target conversion of sodium chlorite to chlorine dioxide is achieved.

The electrolysis cell can also comprise a batch-type cell that electrolyses a volume of the aqueous feed solution. The batch-type cell comprises a batch chamber having a pair of electrodes. The batch chamber is filled with aqueous feed solution comprising the sodium chlorite salt, which is then electrolyzed to form a batch of effluent solution containing chlorine dioxide. The electrodes preferably comprise an outer annular anode and a concentric inner cathode. An example of a suitable batch cell, for use with a sodium chlorite salt supply in accordance with the present invention, is disclosed in WO 00/71783-A1, published Nov. 30, 2000, incorporated herein by reference.

Electrical Current Supply

An electrical current supply provides a flow of electrical current between the electrodes and across the passage of aqueous feed solution passing across the anode. For many applications, the preferred electrical current supply is a rectifier of household (or industrial) current that converts common 100–230 volt AC current to DC current.

For applications involving portable or small, personal use systems, a preferred electrical current supply is a battery or set of batteries, preferably selected from an alkaline, lithium, silver oxide, manganese oxide, or carbon zinc battery. The batteries can have a nominal voltage potential of 1.5 volts, 3 volts, 4.5 volts, 6 volts, or any other voltage that meets the power requirements of the electrolysis device. Most preferred are common-type batteries such as "AA" size, "AAA" size, "C" size, and "D" size batteries having a voltage potential of 1.5 V. Two or more batteries can be wired in series (to add their voltage potentials) or in parallel (to add their current capacities), or both (to increase both the potential and the current). Re-chargeable batteries and mechanical wound-spring devices can also be advantageously employed.

Another alternative is a solar cell that can convert (and store) solar power into electrical power. Solar-powered photovoltaic panels can be used advantageously when the power requirements of the electrolysis cell draws currents below 2000 milliamps across voltage potentials between 1.5 and 9 volts.

In one embodiment, the electrolysis cell can comprise a single pair of electrodes having the anode connected to the positive lead and the cathode connected to the negative lead of the battery or batteries. A series of two or more electrodes, or two or more cells (each a pair of electrodes) can be wired to the electrical current source. Arranging the cells in parallel, by connecting each cell anode to the positive terminal(s) and each cell cathode to the negative terminal(s), provides the same electrical potential (voltage) across each cell, and divides (evenly or unevenly) the total current between the two or more electrode pairs. Arranging two cells (for example) in series, by connecting the first cell anode to the positive terminal, the first cell cathode to the second cell anode, and the second cell cathode to the negative terminal, provides the same electrical current across each cell, and divides the total voltage potential (evenly or unevenly) between the two cells.

The electrical current supply can further comprise a circuit for periodically reversing the output polarity of the battery or batteries in order to maintain a high level of electrical efficacy over time. The polarity reversal minimizes or prevents the deposit of scale and the plating of any charged chemical species onto the electrode surfaces. Polarity reversal functions particularly well when using confronting anode and cathode electrodes.

Chlorine Dioxide Effluent

The discharged effluent containing the converted chlorine dioxide is removed from the electrolysis cell and is used, for example, as an aqueous disinfection or an aqueous bleaching solution. The effluent can be used as-made by direct delivery to an oxidizable source that is oxidized by the chlorine dioxide. The oxidizable source can be a second source of water or other aqueous solution comprising microorganisms are destroyed when mixed or contacted with the effluent solution. Microorganisms contained within the aqueous feed solution would also be destroyed. The oxidizable source can also be an article or object on which oxidizable material is affixed or positioned, such as a kitchen or bathroom surface, including utensils, flatware, plates, sinks, countertops, and the tub and shower areas, appliance surfaces, as well as stains on clothing.

The concentrated effluent containing a high concentration of chlorine dioxide can be achieved and maintained by holding the effluent at temperatures below about 5 degrees centigrade, and/or reducing or eliminating sunlight. The effluent can be stored in glass-lined and chemically-resistant plastic surfaced containers.

When chlorine dioxide oxidizes an oxidizable material, such as a microorganism or a bleachable stain, the chlorine dioxide releases one of its electron pair and, in the presence of sodium ions, reverts back to sodium chlorite. Because the method and apparatus of the present invention can convert chlorite into chlorine dioxide in simple, non-membrane electrolysis cells, a preferred system for forming chlorine dioxide from an aqueous solution comprises a means for returning the reverted chlorite salts back to the aqueous feed solution, for subsequent re-conversion to chlorine dioxide.

The method of making halogen dioxide, according to another preferred embodiment of the present invention, comprises the steps of:

(1) providing an aqueous supply solution comprising halogen dioxide salt;

(2) passing a portion of the aqueous supply solution a chamber of an electrolysis cell, preferably a non-membrane electrolysis cell comprising an anode and a cathode, and along a passage adjacent to the anode; and (3) flowing an electrical current between the anode and the cathode, thereby electrolyzing the aqueous feed solution in the passage, whereby a portion of the halogen dioxide salt is converted to halogen dioxide, and forming an aqueous effluent comprising halogen dioxide;

(4) oxidizing an oxidizable material with the converted halogen dioxide in the aqueous effluent, whereby the halogen dioxide reverts back to a halogen dioxide salt; and (5) returning the used effluent solution comprising the reverted halogen dioxide salt back to the aqueous supply solution.

The oxidizable material can be contacted with the aqueous effluent containing the halogen dioxide in various ways, such as by pouring or spraying the aqueous effluent onto an oxidizable material or an object having an oxidizable material, or by emerging the material or object into the aqueous effluent. The used effluent solution comprising the reverted halogen dioxide salt can be passed through a filter or other type of separator to remove insoluble or particulate matter, before being returned to be used as, or mixed with, the aqueous feed solution.

A preferred embodiment of the present invention comprises halogen dioxide generating and re-cycling system, comprising:

a) a source of an aqueous feed solution comprising a halogen dioxide salt;

b) a non-membrane electrolysis cell comprising an anode and a cathode, and having a cell chamber with an inlet and an outlet;

c) a means for passing the aqueous feed solution into the chamber and along a passage adjacent to the anode, and out of the outlet;

d) an electric current supply to flow a current through the aqueous solution between the anode and the cathode, to convert a portion of the halogen dioxide salt in the passage to halogen dioxide, and thereby form an aqueous effluent comprising halogen dioxide;

e) a means for delivering the aqueous effluent into contact with a halogen dioxide depletion target, whereby a portion of the halogen dioxide in the aqueous effluent oxidizes the depletion target and reverts back to a halogen dioxide salt; and f) a means for returning the depleted effluent comprising the reverted halogen dioxide salt back to the source.

The means for passing the aqueous feed solution (herein after, "feed means") into the cell can be a pump, or an arrangement where gravity or pressure forces aqueous feed solution from a storage container into the cell. The means for delivering the aqueous effluent into contact with the halogen depletion target can be the feed means, or can be a separate pump or gravity/[pressure arrangement.

The system can also comprise a re-circulation line through which a portion of the effluent solution is returned back to the inlet of the electrolysis cell. As herein before described, re-circulating the effluent back to the cell increases the total conversion of the halogen dioxide salt to the halogen dioxide product.

The means for returning the depleted effluent can be a collection tank with a means, such as any of the feed means, for recycling the depleted effluent back to the source.

Preferred Embodiments

Highly preferred is a low powered (preferably, portable) electrolysis cell that can use the current and voltage delivered by conventional household batteries. The electrolysis cells can come in various sizes, with anodes having a surface area of from about 0.1 $cm^2$ to about 60 $cm^2$.

One particularly preferred embodiment of the present invention comprises an spray nozzle having, in the spray solution pathway leading to the spray nozzle, an electrolysis cell with an anode having a surface area of from about 0.1 $cm^2$ to about 20 $cm^2$, more preferably from about 2 $cm^2$ to about 8 $cm^2$. The spray solution can be pumped to the electrolysis cell by a trigger-actuated pump or an electrically-driven motorized pump. Such spray pump units will typically spray from about 100 to about 300 cc/min. of spray solution.

The spray solution will generally comprise a halogen dioxide salt and at least one surfactant selected from the group consisting of: anionic, nonionic, cationic, zwitterionic, amphoteric or soap surfactants. The spray solution can optionally comprise one or more other ingredients selected from enzymes, auxiliary bleach ingredients, electrolytes, builders and sequestering agents, chelants, brighteners, colorants, pH buffering agents, perfumes, odor absorbing ingredients, and mixtures thereof.

EXAMPLES

Example 1

An electrolysis cell of the general design shown in FIG. 1 was used to convert an aqueous solution comprising sodium chlorite into an effluent solution comprising chlorine dioxide. The electrolysis cell had a pair of confronting electrodes having a passage gap of about 0.19 mm. The anode was made of ES300—titanium, coated with ruthenium oxide and iridium oxide. The cathode was made of 201 stainless steel. The dimensions of the planar electrodes were 75.2 mm long by 25.4 mm wide.

The aqueous feed solution was prepared by mixing 10 liters of de-ionized water with 62.6 gms technical grade sodium chlorite stock (80% active, Aldrich Chemical Company, Inc, Milwaukee, Wis. 53233; Cat. No. 24415-5) with a stirring bar until dissolved, forming a 5000 ppm sodium chlorite salt solution. The aqueous feed solution was retained in a 15-liter glass container placed within a light-proof box and cooled to 5 degrees Celsius. A peristaltic pump metered the aqueous feed solution from the glass container through the electrolysis cell at a flow rate of 300 ml/minute. A direct current of 5.72 amps was applied across the electrodes by a DC power supply to provide a voltage potential of 4.5 volts across the electrolysis cell. The effluent solution was withdrawn from the electrolysis cell and analyzed. The effluent contained 109 ppm chlorine dioxide and 4891 ppm of un-reacted sodium chlorite, for a chlorite conversion of 2.9%.

Example 2

The electrolysis cell of Example 1 was operated using an aqueous feed solution of 445 ppm of sodium chlorite stock (80% active) in 1 liter of de-ionized water, to provide a concentration of chlorite ion of 266 ppm. The effluent was re-circulated to the 1.5-liter glass container, which was open to the air in a laboratory hood. The flow rate was set at 200 ml/min. A voltage potential of 5.0 volts was provided across the electrolysis cell at a current of 1.7 amps. Aliquot samples of the aqueous feed solution were taken periodically to monitor the conversion of the sodium chlorite, and the levels of chlorine dioxide and sodium chlorite were measured and recorded at the time intervals shown in Table A.

TABLE A

| Time | Chlorine Dioxide | Chlorite ion | Conversion |
|---|---|---|---|
| 5 min | 7.6 ppm | 258 ppm | 2.9% |
| 10 min | 15.9 ppm | 250 ppm | 6.0% |
| 15 min | 18.9 ppm | 247 ppm | 7.1% |
| 18 min | 19.7 ppm | 246 ppm | 7.4% |

Example 3

The electrolysis cell of the general design shown in FIG. 1 was operated with an aqueous feed solution containing 1000 ppm chlorite ion, prepared by mixing 1676 ppm of sodium chlorite (80% active stock) in 50 liters of de-ionized water within an open polypropylene container. The electrolysis cell had a pair of confronting electrodes, each 100 mm long by 60 mm wide and having a passage gap of about 0.45 mm. A voltage potential of 7.5 volts was provided across the electrolysis cell at a current of 15.0 amps. The outlet of the electrolysis cell was re-circulated back to the container. The pump speed was adjusted to pass the solution through the cell at 4.2 liter/min. The system was operated for fifty minutes. The effluent was periodically sampled and analyzed to monitor the levels of chlorine dioxide and the sodium chlorite, at the time intervals and with the results shown in Table B.

TABLE B

| Time | Chlorine Dioxide | Chlorite ion | Conversion |
|---|---|---|---|
| 10 min | 14.0 ppm | 986 ppm | 1.4% |
| 25 min | 28.9 ppm | 971 ppm | 2.9% |
| 50 min | 52.1 ppm | 948 ppm | 5.2% |

Example 4

A pump passes 2 liter/min. of an aqueous feed solution containing 2000 ppm sodium chlorite (80% active stock) through the electrolysis cell of Example 3, to generate an effluent containing at least 20 ppm chlorine dioxide. The effluent is directed at a suitable microbial bioload, sufficient to completely neutralize the generated chlorine dioxide. The resulting effluent is collected and analyzed, and is determined to have no chlorine dioxide and about 2000 ppm residual effluent. The residual effluent solution with no measurable chlorine dioxide is returned to the 15 liter glass container. The system runs continuously at substantially these conditions.

Example 5

An electrolysis cell was incorporated into the flow path of a battery-powered spray bottle that delivers about 175 ml/min of spray solution. The electrolysis cell has a confronting anode and cathode that are 2 cm wide×6 cm long, with a 0.2 mm chamber gap. The battery provides a potential of about 3.6 V. The aqueous feed solution comprises about 500 ppm sodium chlorite (about 298 ppm of equivalent chlorite ion). The resulting chlorine dioxide concentration in the effluent stream is 3.9 ppm (a chlorite conversion of 1.3%).

Example 6

The electrolysis cell of Example 1 was operated using an aqueous feed solution of either 100 or 500 ppm of sodium chlorite, made from de-ionized water. The electrolysis cell has a pair of confronting electrodes having a chamber gap of about 0.3 mm. The resulting chlorine dioxide concentration in the effluent stream is shown in Table C.

TABLE C

| Flow rate | Sodium Chlorite | Anode Area | Watts | Chlorine Dioxide |
|---|---|---|---|---|
| 100 ml/min | 500 ppm | 3 cm$^2$ | 0.11 | 0.77 ppm |
| 100 ml/min | 500 ppm | 4.5 cm$^2$ | 0.32 | 1.79 ppm |
| 100 ml/min | 500 ppm | 9 cm$^2$ | 0.54 | 2.58 ppm |
| 100 ml/min | 500 ppm | 18 cm$^2$ | 1.04 | 4.81 ppm |
| 400 ml/min | 500 ppm | 3 cm$^2$ | 0.11 | 0.57 ppm |
| 400 ml/min | 500 ppm | 4.5 cm$^2$ | 0.29 | 0.72 ppm |
| 400 ml/min | 500 ppm | 9 cm$^2$ | 0.50 | 1.02 ppm |
| 400 ml/min | 500 ppm | 18 cm$^2$ | 1.01 | 1.81 ppm |
| 100 ml/min | 100 ppm | 3 cm$^2$ | 0.04 | 0.14 ppm |
| 100 ml/min | 100 ppm | 4.5 cm$^2$ | 0.11 | 0.32 ppm |
| 100 ml/min | 100 ppm | 9 cm$^2$ | 0.22 | 0.41 ppm |
| 100 ml/min | 100 ppm | 18 cm$^2$ | 0.43 | 0.74 ppm |
| 400 ml/min | 100 ppm | 3 cm$^2$ | 0.04 | 0.09 ppm |
| 400 ml/min | 100 ppm | 4.5 cm$^2$ | 0.07 | 0.12 ppm |
| 400 ml/min | 100 ppm | 9 cm$^2$ | 0.14 | 0.19 ppm |
| 400 ml/min | 100 ppm | 18 cm$^2$ | 0.36 | 0.30 ppm |

The various advantages of the present invention will become apparent to those skilled in the art after a study of the foregoing specification and following claims.

What is claimed is:

1. A method for making an aqueous solution comprising halogen dioxide, comprising the steps of:
   (1) providing an aqueous feed solution comprising a halogen dioxide salt;
   (2) passing the aqueous feed solution into a cell chamber of a non-membrane electrolysis cell comprising an anode and a cathode, and along a passage adjacent to the anode, wherein said cell having said cell chamber does not have an ion permeable membrane that divides the cell into distinct anode and cathode chambers;
   (3) flowing an electrical current of less than 1.0 watt between the anode and the cathode, thereby electrolyzing the aqueous feed solution in the passage, whereby a portion of the halogen dioxide salt in the passage is converted to halogen dioxide; and
   (4) passing the electrolyzed aqueous solution out of the electrolysis cell, thereby forming an aqueous effluent comprising halogen dioxide
wherein said method results in a production of halogen dioxide at a level of from about 1 ppm to about 200 ppm.

2. The method of claim 1 wherein the anode and the cathode are confronting and co-extensive, with a chamber gap of 0.5 mm or less.

3. The method of claim 1 wherein the anode is a porous anode.

4. The method of claim 3 wherein the porous anode is a porous metallic anode.

5. The method of claim 1 wherein the halogen dioxide comprises a halite salt, and is preferably a chlorite salt, and the halogen dioxide formed is chlorine dioxide.

6. The method of claim 1 wherein the aqueous feed solution comprises the halogen dioxide salt at a concentration of at least 0.1 ppm.

7. The method of claim 1 wherein the aqueous effluent has less than 1.0 ppm, preferably less than 0.1 ppm, free chlorine.

8. The method of claim 1, further comprising the step of passing a portion of the aqueous effluent back into the aqueous feed solution.

9. A method for making an aqueous solution comprising halogen dioxide, comprising the steps of:
   (1) providing an aqueous feed solution comprising a halogen dioxide salt;
   (2) passing an aqueous feed solution of at least 400 ml per minute into a cell chamber of a non-membrane electrolysis cell comprising an anode, a cathode, and an anode outlet, and along a passage adjacent to the anode, wherein said cell having said cell chamber does not have an ion permeable membrane that divides the cell into distinct anode and cathode chambers;
   (3) flowing an electrical current of less than 1.0 watt between the anode and the cathode, thereby electrolyzing the aqueous feed solution in the passage, whereby a portion of the halogen dioxide salt in the passage is convened to halogen dioxide; and
   (4) passing the electrolyzed solution adjacent the anode out of the chamber through the anode outlet;
thereby forming an aqueous anode effluent comprising halogen dioxide
wherein said method further comprises the step of returning a remaining cathode effluent back into the aqueous feed solution;
wherein said method results in a production of halogen dioxide at a level of from about 1 ppm to about 200 ppm;

10. The method of claim 9 wherein the halogen dioxide comprises a halite salt, and is preferably chlorite salt, and the halogen dioxide formed is chlorine dioxide.

11. A method of making an aqueous solution comprising halogen dioxide, comprising the steps of:
   (1) providing an aqueous supply solution comprising halogen dioxide salt;
   (2) passing a portion of the aqueous supply solution into a cell chamber of a non-membrane electrolysis cell comprising an anode and a cathode, and along a passage adjacent to the anode, wherein said cell having said cell chamber does not have an ion permeable membrane that divides the cell into distinct anode and cathode chambers;
   (3) flowing an electrical current of less than 1.0 watt between the anode and the cathode, thereby electrolyzing the aqueous feed solution in the passage, whereby a portion of the halogen dioxide salt is converted to halogen dioxide, and forming an aqueous effluent comprising halogen dioxide;
   (4) oxidizing an oxidizable material with the converted halogen dioxide in the aqueous effluent, whereby the halogen dioxide reverts back to a halogen dioxide salt; and
   (5) returning the used effluent solution comprising the reverted halogen dioxide salt back to the aqueous supply solution
wherein said method results in a production of halogen dioxide at a level of from about 1 ppm to about 200 ppm.

12. The method of claim 11 wherein the halogen dioxide is a chlorite salt.

13. A halogen dioxide generating system, comprising:
   a) a source of an aqueous feed solution comprising a halogen dioxide salt;
   b) a non-membrane electrolysis cell comprising an anode and a cathode spaced apart from said anode, said anode and said cathode being separated by a non-conducting porous flow barrier in contact with each of said anode and said cathode, and having a cell chamber with an inlet and an outlet, wherein said chamber does not have an ion permeable membrane that divides the cell into distinct anode and cathode chambers;
   c) a means for passing the aqueous feed solution into the chamber and along a passage through said porous flow barrier adjacent to the anode, and out of the outlet; and
   d) an electric current supply to flow a current through the aqueous feed solution in the passage, to convert a portion of the halogen dioxide salt to halogen dioxide, and thereby form an aqueous effluent comprising halogen dioxide
wherein said system produces from about 1 ppm to about 200 ppm of halogen dioxide.

14. The halogen dioxide generating system of claim 13 wherein the anode and the cathode are confronting and co-extensive, with a chamber gap of 0.5 mm or less.

15. The halogen dioxide generating system of claim 13 wherein the anode is a metallic porous anode.

16. A halogen dioxide generating and re-circulating system, comprising:
   a) a source of an aqueous feed solution comprising a halogen dioxide salt;
   b) a non-membrane electrolysis cell comprising an anode and a cathode spaced apart from said anode, said anode and said cathode being separated by a non-conducting porous flow barrier in contact with each of said anode and said cathode, and having a cell chamber with an inlet and an outlet, wherein said chamber does not have an ion permeable membrane that divides the cell into distinct anode and cathode chambers;
   c) a means for passing the aqueous feed solution into the chamber, and along a passage through said porous flow barrier adjacent to the anode, and out of the outlet;
   d) an electric current supply to flow a current through the aqueous solution between the anode and the cathode, to convert at least a portion of the halogen dioxide salt in the passage to halogen dioxide, and thereby form an aqueous effluent comprising halogen dioxide;
   e) a means for delivering the aqueous effluent into contact with a halogen dioxide depletion target, whereby a portion of the halogen dioxide in the aqueous effluent oxidizes the depletion target and reverts back to a halogen dioxide salt; and
   f) a means for returning the depleted effluent comprising the reverted halogen dioxide salt back to the source
wherein said system produces from about 1 ppm to about 200 ppm of halogen dioxide.

17. A battery-powered electrolysis device for use to make on demand an aqueous solution comprising chlorine dioxide, comprising:
   a) an electrolysis cell comprising an anode and a cathode and a non-conducting porous flow barrier disposed between the anode and the cathode and in contacting relationship therewith, and having a cell chamber,
   b) a pump for providing an aqueous feed solution comprising a halogen dioxide salt into the cell chamber and along a passage through said porous barrier adjacent to the anode,
   c) a battery for flowing electrical current between the anode and the cathode when the aqueous feed solution flows within the chamber and along the passage, whereby a portion of the halogen dioxide salt is converted to halogen dioxide
wherein said electrolysis cell further comprises a single outlet in fluid communication with the cell chamber
further wherein said device requires less than about 8.5 watts of power.

18. The battery-powered electrolysis device according to claim 17, wherein the device is a solution spray bottle, wherein the pumping means comprises a electrically-driven pump that pumps solution from the bottle to the electrolysis cell, and wherein the electrolysis cell comprises an anode and a confronting, co-extensive cathode, having a cell chamber gap of 0.5 mm or less.

19. An electrolysis cell for electrolyzing an aqueous solution, comprising:
   a porous anode,
   a cathode spaced apart from said anode to provide a flow path therebetween, said flow path further comprising a non-conducting porous flow barrier disposed therein,
   a cell chamber positioned between the porous anode and the cathode, the cell chamber having said non-conducting porous flow barrier; whereby each of the porous anode and the flow barrier exert a resistance to the flow of the aqueous solution through the electrolysis cell wherein said electrolysis cell further comprises a partition in said cell chamber, said partition separating effluent exiting the cell chamber adjacent the anode from effluent exiting the cell chamber adjacent the cathode.

20. The electrolysis cell of claim 19, wherein the porous anode is a metallic porous anode.

21. The electrolysis cell of claim 19, wherein the flow barrier comprises a porous plastic.

22. The electrolysis cell of claim 19, wherein the aqueous solution comprises a halogen dioxide salt.

\* \* \* \* \*